Feb. 7, 1961 W. J. SULLER ET AL 2,970,679
AUTOMATIC TRANSMISSION GEAR SELECTOR SAFETY DEVICE
Filed Oct. 26, 1959 2 Sheets-Sheet 1

William J. Suller
John M. Fernandez
INVENTORS

BY *[signatures]*
Attorneys

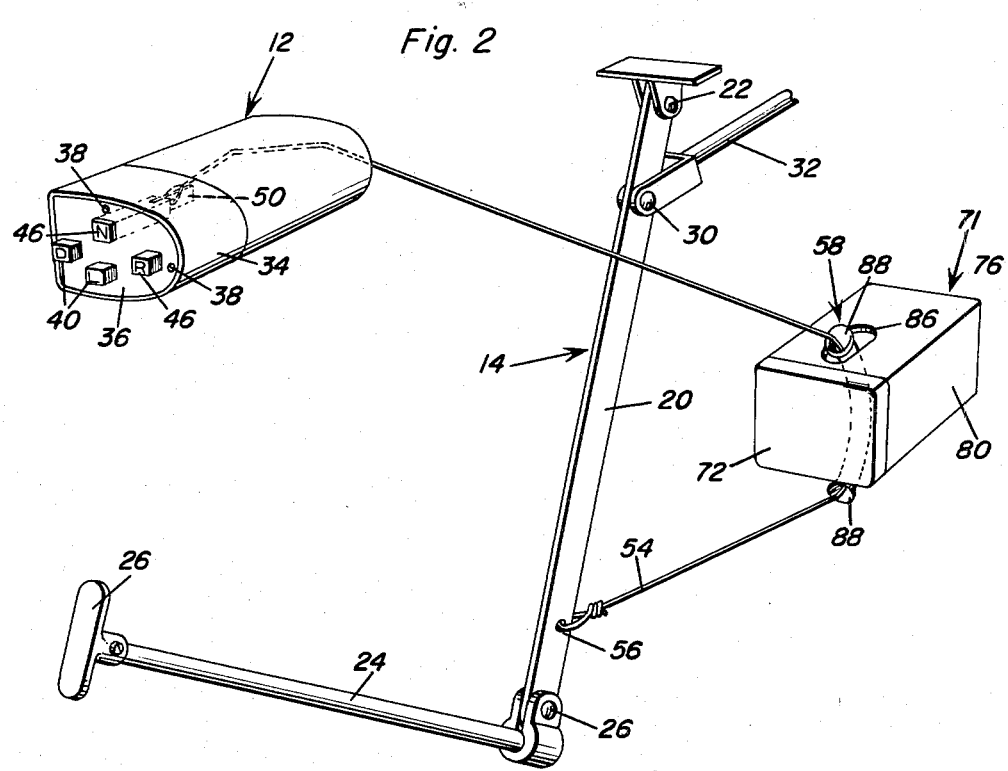

United States Patent Office 2,970,679
Patented Feb. 7, 1961

2,970,679
AUTOMATIC TRANSMISSION GEAR SELECTOR SAFETY DEVICE

William J. Suller, 174 Hemingway Ave., East Haven, Conn., and John M. Fernandez, 17 Woodside Path, West Haven, Conn., assignors of one-third to Edward L. Reynolds, East Haven, Conn.

Filed Oct. 26, 1959, Ser. No. 848,745

7 Claims. (Cl. 192—4)

This invention relates to a novel and useful device and more specifically to a safety device which is adapted to be secured between the emergency brake mechanism and a conventional form of push button gear selector mechanism whereby either the park or neutral push button will be depressed upon the movement of the emergency brake mechanism to apply the emergency brake.

The development of automatic transmissions has increased the number of accidents caused by a vehicle being started while in gear or accidentally placed in gear while the motor is running. Automatic transmissions enable a vehicle to remain stationary although the transmission is in gear and the motor is running and should the accelerator pedal or other throttle controls be accidentally depressed, the vehicle is quite likely to be placed in motion even though the emergency brake of the vehicle is applied. The newer and more powerful engines utilized in motor vehicles today have sufficient power to move a motor vehicle even though the emergency brake has been applied.

Most delinquent drivers that leave vehicles unattended with the motor running and the transmission in gear, will at least apply the emergency brake in an attempt to avoid any accidents, and although this precaution of applying the emergency brake is taken, there have been many instances where driverless vehicles have run down the driver himself or other persons because of the throttle control being accidentally operated by a passenger in the vehicle. These are the accidents which the present invention will eliminate. The invention incorporates the use of a means for interconnecting the emergency brake mechanism of a vehicle and the controls for operating the shifting mechanism in such a manner whereby the application of the emergency brake will automatically place the automatic transmission of a vehicle in either the neutral or park position so that if the throttle is opened there will be no tendency for the vehicle to move. Further, the invention is designed to eliminate the movement of the transmission into gear until the emergency brake is released.

It is therefore the main object of this invention to provide a gear selector safety device for automatic transmissions which will, by use of an inner connecting means, disengage the gears of the transmission upon the applying of the emergency brake. That is to say, if the vehicle transmission can be placed in either "neutral" or "park" position automatically upon the applying of the emergency brake, any accidental depression or operation of the throttle linkage of the motor vehicle while the motor is running will not result in the motor vehicle being placed in motion.

A further object of this invention is to provide a safety device which may be readily interconnected between the newer "push button type" of automatic transmission selector assemblies and a lever of the emergency brake mechanism.

Yet a further object of the invention, in accordance with the preceding objects, is to provide a mechanical connection between a push button assembly of a push button gear selector and the operating lever or arm of the emergency brake mechanism of a vehicle having a means for providing a lost motion connection whereby the final movement of a selected push button to position the automatic transmission in the corresponding gear will not restrict further movement of the operating lever or arm of the brake mechanism to apply the emergency brake of the vehicle if a greater movement of the latter is required because of normal wear to the brake linings.

A still further object is to provide a means for interconnecting the transmission gear selector mechanism and the emergency brake mechanism of a vehicle in such a manner whereby the gear selector mechanism may not be operated to place the transmission in gear until such time as the emergency brake is released.

A final object to be specifically enumerated herein is to provide a gear selector safety device for automatic transmissions which will conform to conventional forms of manufacture, be extremely simple in construction, and be easily installed in existing vehicles so as to provide a device that will be economically feasible relatively trouble free and a device that substantially every "do-it-yourself" vehicle owner will be able to install in a relatively short period of time.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a somewhat enlarged perspective view of the invention mounted between the push button gear selector assembly and the brake mechanism of a vehicle, portions of the vehicle being omitted;

Figure 4 is a sectional view taken substantially upon the plane indicated by the section line 4—4 of Figure 3; and Figure 5 is an enlarged exploded perspective view of one of the push buttons of the gear selector assembly showing the manner in which one end of the connecting element is secured to the push button mechanism.

Figure 1:
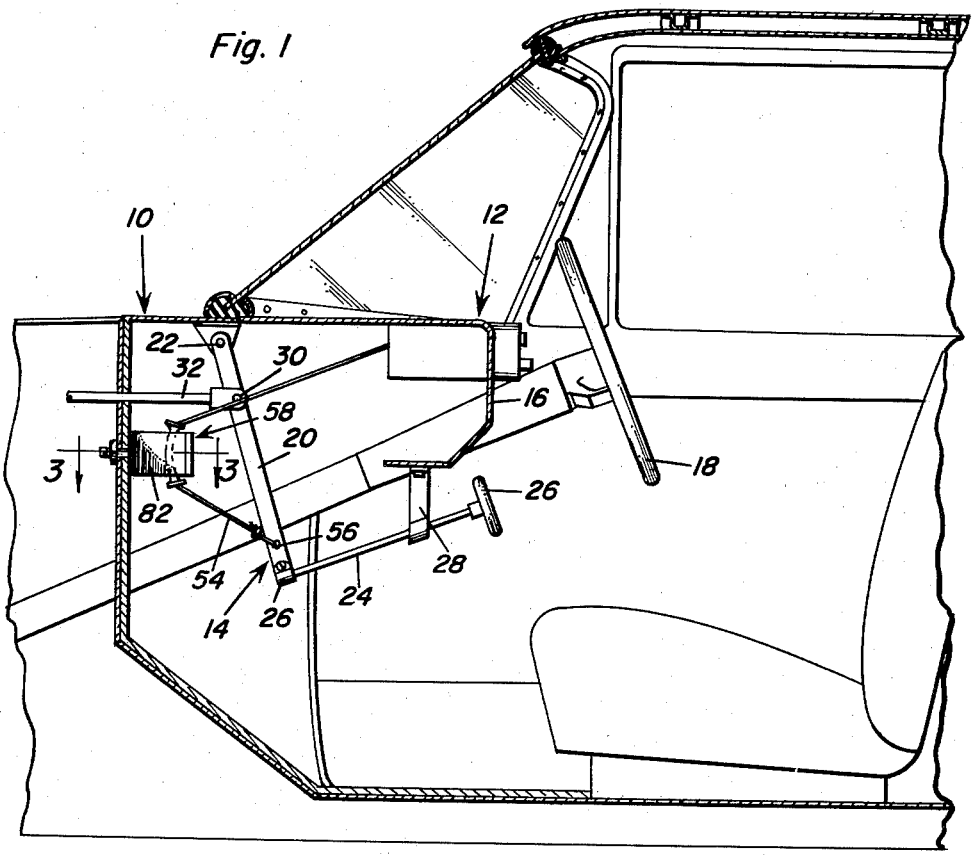
Figure 1 is an elevational view of the safety device shown mounted between a conventional form of push button gear selector assembly and the emergency brake mechanism of a vehicle, parts of the vehicle being broken away and shown in section.
Figure 3:
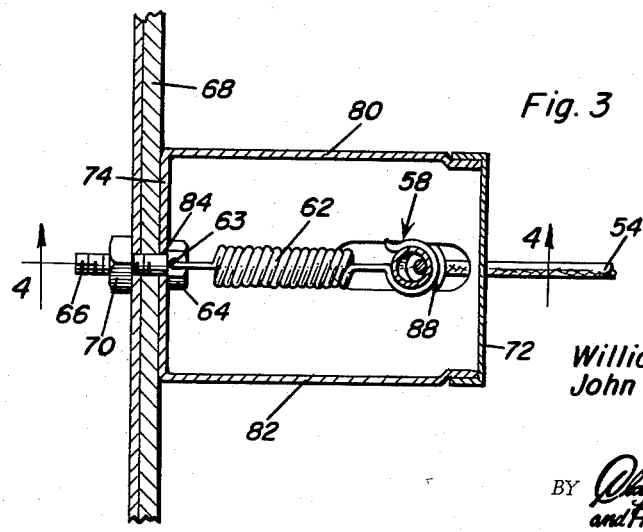
Figure 3 is an enlarged horizontal sectional view taken substantially upon the plane indicated by the section line 3—3 of Figure 1.

Referring now more specifically to the drawings, the numeral 10 generally designates a motor vehicle body in which there is secured a conventional form of push button gear selector assembly generally designated by the reference numeral 12 and an emergency brake mechanism generally designated by the reference numeral 14.

The push button gear selector assembly 12 is mounted through the dashboard 16 of the vehicle 10 and is positioned slightly forward of the steering wheel 18 of the vehicle to be readily accessible by a person seated in position to drive the vehicle 10.

The brake mechanism 14 includes an operating lever 20 pivotally secured to the vehicle structure as at 22 and has one end of operating rod 24 pivotally secured thereto as at 26. The end of the operating rod 24 adjacent the driving position of the vehicle 10 is provided with a suitable handle 26 which may be manipulated by the driver to apply the emergency brake by pulling the handle 26 in an upward direction toward steering wheel 18. The end of the operating rod 24 adjacent the handle 26 is slidably disposed in a support assembly 28 which includes a means (not shown) for retaining the operating rod 24 in adjusted positions and is mounted on the lower edge of the dash 16 in any convenient manner.

Secured to the operating lever 20 by means of pivot bolt 30 is one end of the emergency brake mechanism linkage 32 which is connected to the emergency brakes (not shown) of the vehicle 10.

With attention now directed more particularly to Figures 2 and 5 of the drawings it will be seen that the push button gear selector assembly 12 includes a housing 34 having an apertured face plate 36 secured thereto by means of suitable fasteners 38 through which extend one end of each of the push button assemblies 40. Each of the push button assemblies 40 comprises a button 42 having a retaining shoulder 44 thereon. The outer end of each of the push button assemblies 40 which projects through the face plate 36 is provided with suitable indicia 46 for indicating one of the gear positions of the automatic transmission (not shown). The other end of each of the push buttons 40 is suitably notched as at 48 or otherwise formed to slidably receive one end of a push bar 50 which has formed thereon complementary projections 52. Thus it will be seen that each of the push buttons 40 may be readily disconnected from the corresponding push bar 50 by means of outward movement of the push button 40 after the face plate 36 has been removed. It is to be understood that the construction of the push button assembly 40 may vary as different designs are used by different automobile manufacturers. Furthermore, it is to be noted that the projections 52 are for the most part only frictionally retained within the notches 48.

With attention now directed more particularly to Figure 2 of the drawings, it will be noted that one end of a flexible member 54 is secured through the usual aperture 56 provided in the operating lever 20. Although it is shown in the drawings that this end of the flexible member 54 is merely passed through the aperture 56 and is wound about itself to form a loop fixedly securing that end of the flexible member 54 to the operating lever 20, any convenient means may be utilized to secure the end of the flexible member 54 to the operating lever 20. The flexible member 54 extends from the operating lever 20 and is slidably received through a curved tubing generally designated by the reference numeral 58 which comprises a guide means for the flexible member 54. The other end of the flexible member 54 then extends upwardly and has provided thereon a loop 60 which is looped around one of the projections 52 on the push bar 50. Again, although the other end of the flexible member 54 is shown provided with a loop 60 it is to be understood that any convenient means may be utilized to secure that end of the flexible member 54 to either the push rod 50 or to the push button 42.

The curved tubing 58 or guide means has secured about its mid-portion one end of an expansion spring 62 whose other end is secured through a suitable aperture 63 formed through the head 64 of a fastener 66 which is in turn secured through the fire wall 68 of the vehicle 10 by means of a threaded nut 70.

In the interest of providing a more pleasing appearance, the curved tubing 58 is enclosed in a housing having a pair of end walls 72 and 74 interconnected by means of two pairs of oppositely disposed side walls 76, 78 and 80 and 82. The end wall 74 is provided with an aperture 84 which receives therethrough the shank of the fastener 66 whereby the head 64 of the fastener 66 will secure the housing 71 to the fire wall 68. The two side walls 76 and 78 are each provided with a slot 86 with the two slots being aligned and receiving therethrough the opposite end portions of the curved tubing 58, which end portions are flared as at 88.

It is to be understood that although only one guide means 58 is shown, if more are needed for any reasons such as subsequent changes in the positioning of the push button gear selector assemblies 12 or the emergency brake mechanisms 14 by the manufacture of automobiles, that one or more additional guide means 58 can be provided.

It is to be noted, see Figure 1 in particular, that the guide means or tubing 58 is utilized to laterally deflect the flexible member 54 so as to position the opposite end portions of the latter in substantial alignment with the directions of travel of the push button mechanism 40 and the brake mechanism 14.

The conventional form of push button gear selector assemblies utilized in the motor vehicles of today is such that only one button can be depressed at a time. Therefore, if the emergency brake mechanism 14 is applied to depress either the neutral or park button, attempts to depress other buttons will result in failure until the brake mechanism is released thereby enabling the return of the push button to which it is secured to its outer position. The expansion spring 62 enables a lost motion connection between the brake mechanism 14 and the gear selector mechanism 12 so that movement of the neutral button towards a depressed position will not restrict further application of the brake mechanism 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a motor vehicle having an emergency brake mechanism including an operating lever or arm and an automatic transmission mechanism having a plurality of push-button assemblies for selectively engaging the transmission in one gear position while simultaneously disengaging it from another gear position, each of said push button assemblies being movable forwardly of said vehicle to position the transmission in the corresponding gear position and said brake lever or arm having at least a portion thereof movable rearwardly of said vehicle to apply the brakes, a gear selector safety device for moving a selected one of said button assemblies forwardly of said vehicle upon movement of said lever or arm portion rearwardly of said vehicle comprising an elongated flexible member having one end portion secured to said one button assembly and the other end portion attached to said lever or arm portion, and guide means secured to said vehicle forwardly of said push button assemblies and said lever or arm portion, slidably receiving the mid-portion of said flexible member and laterally deflecting said flexible member whereby rearward movement of said lever or arm portion will effect a forward pull on said one button assembly.

2. The combination of claim 1 wherein said guide means includes a curved piece of tubing slidably receiving therethrough a mid-portion of said flexible member.

3. The combination of claim 1 wherein said guide means includes means for resiliently mounting said guide means to said vehicle whereby a lost motion connection between said one push button assembly and said lever or arm portion exists and the movement of said one push button assembly to the forward position will not restrict further movement of said lever or arm portion rearwardly of said vehicle to apply said brakes.

4. The combination of claim 1 wherein said guide means includes means for resiliently mounting said guide means to said vehicle whereby a lost motion connection between said one push button assembly and said lever or arm portion exists and the movement of said one push button assembly to the forward position will not restrict further movement of said lever or arm portion rearwardly of said vehicle to apply said brakes, said guide means including a curved piece of tubing slidably receiving therethrough a mid-portion of said flexible member.

5. The combination of claim 4 wherein said mounting means comprising a fastener adapted for securement to said vehicle, said resilient means comprising an expansion spring having one end secured to said fastener and one end secured to said curved tubing.

6. The combination of claim 5 including a housing for said guide means, said housing having at least two by two opposite side walls, an aperture in one of said end walls, said aperture receiving a portion of said fastener therethrough, a pair of aligned slots formed in said end walls, said tubing being disposed within said housing with the opposite ends thereof projecting through said slots.

7. The combination of claim 1 wherein said guide means includes a curved piece of tubing slidably receiving therethrough a mid-portion of said flexible member, the opposite ends of said tubing being flared.

References Cited in the file of this patent

UNITED STATES PATENTS 2,705,551 Morphet _____ Apr. 5, 1955